United States Patent [19]

Hodgson

[11] Patent Number: 5,166,783
[45] Date of Patent: Nov. 24, 1992

[54] DIGITAL VIDEO COLOR PROCESSOR WITH ANTI-ALIASING FILTER

[75] Inventor: David O. Hodgson, San Mateo, Calif.

[73] Assignee: Sony Corporation of America, Park Ridge, N.J.

[21] Appl. No.: 740,623

[22] Filed: Aug. 5, 1991

[51] Int. Cl.$^5$ ............................................. H04N 5/253
[52] U.S. Cl. ...................................... 358/54; 358/80; 358/214
[58] Field of Search ................ 358/54, 51, 76, 80, 358/183, 22, 214, 37; 355/20, 38; 364/724.16, 724.11, 724.01

[56] References Cited

U.S. PATENT DOCUMENTS

| | | | |
|---|---|---|---|
| 4,418,358 | 11/1983 | Poetsch et al. | 358/80 |
| 4,597,006 | 6/1986 | Orsburn | 358/22 |
| 4,679,067 | 7/1987 | Belmares-Sarabia et al. | 358/29 |
| 4,691,293 | 9/1987 | Conboy | 364/724.16 |
| 4,763,186 | 8/1988 | Belmares-Sarabia et al. | 358/22 |
| 5,023,711 | 6/1991 | Erhardt | 358/75 |
| 5,043,803 | 7/1991 | Asaida | 358/51 |
| 5,111,283 | 5/1992 | Nagasawa et al. | 358/41 |

FOREIGN PATENT DOCUMENTS

| | | | |
|---|---|---|---|
| 57-203386 | 12/1982 | Japan | 358/13 C |
| 60-197088 | 10/1985 | Japan | 358/13 C |

OTHER PUBLICATIONS

"Digital Multi Effects DME-5000 (NTSC)", Sony Corporation brochure, seven pages.
D'Luna et al., "A Digital Video Signal Post-Processor For Color Image Sensors", IEEE 1989 Custom Integrated Circuits Conference, pp. 24.2.1 through 24.2.4.
"Telecine—The State of the Manufacturers", three pages.
Brochure entitled "DaVinci Unified Color Correction System", Dynatech Broadcast Group Limited, printed Oct. 1987.

Primary Examiner—Edward L. Coles, Sr.
Assistant Examiner—Kim Yen Vu
Attorney, Agent, or Firm—Limbach & Limbach

[57] ABSTRACT

A method and system for digitally performing a color transformation on digitized color film images. The digitized images may comprise frames of a digital video signal, with a red frame, a blue frame, and a green frame collectively corresponding to a digitized color image. The invention avoids aliasing error by employing a set of low pass filters, connected in parallel, to filter the digital input data prior to color correction. The output of each filter is processed digitally in a separate color correction circuit. Each color correction circuit implements a different polynomial term of a color transformation. The outputs of the color correction circuits are combined to generate a color corrected output data stream.

14 Claims, 10 Drawing Sheets

DIGITAL VIDEO COLOR PROCESSOR WITH ANTI-ALIASING FILTER

FIELD OF THE INVENTION

The invention is a method and apparatus for digitally performing a color transformation on digitized color film images. The apparatus of the invention is suitable for use in a system for generating digitized color film images from motion picture film.

BACKGROUND OF THE INVENTION

Conventional motion picture film comprises frames that are displayed sequentially at a frame rate of 24 frames per second (24 fps), or 30 fps, or some other rate. Required special effects may embodied in the displayed film.

Systems (including "telecine" systems) have been developed for converting motion picture film into video signals. These systems generate a video signal from motion picture film images by scanning the film frames sequentially to generate digitized film images. They then convert the digitized images into a video signal having a standard video frame rate (25 video frames per second for PAL video, 29.97 video frames per second for NTSC video, or 30 video frames per second for SMPTE-240M high definition video). Each video frame consists of two fields.

Conventional analog circuits have been developed for performing color correction on digitized film images. However, until the present invention, digital color correction circuitry had undesirably introduced aliasing error into digitized film image signals undergoing correction therein.

SUMMARY OF THE INVENTION

The invention is a method and system for digitally performing a color transformation on digitized color film images. The digitized images may comprise frames of a digital video signal, with a red frame, a blue frame, and a green frame collectively corresponding to a digitized color image.

The invention avoids aliasing error by employing a set of low pass filters, connected in parallel, to filter the digital input data prior to color correction. The output of each filter is processed digitally in a separate color correction circuit. Each color correction circuit implements a different polynomial term of a color transformation. The outputs of the color correction circuits are combined to generate a color corrected output data stream.

DETAILED DESCRIPTION OF THE PREFERRED EMBODIMENT

Figure 1:
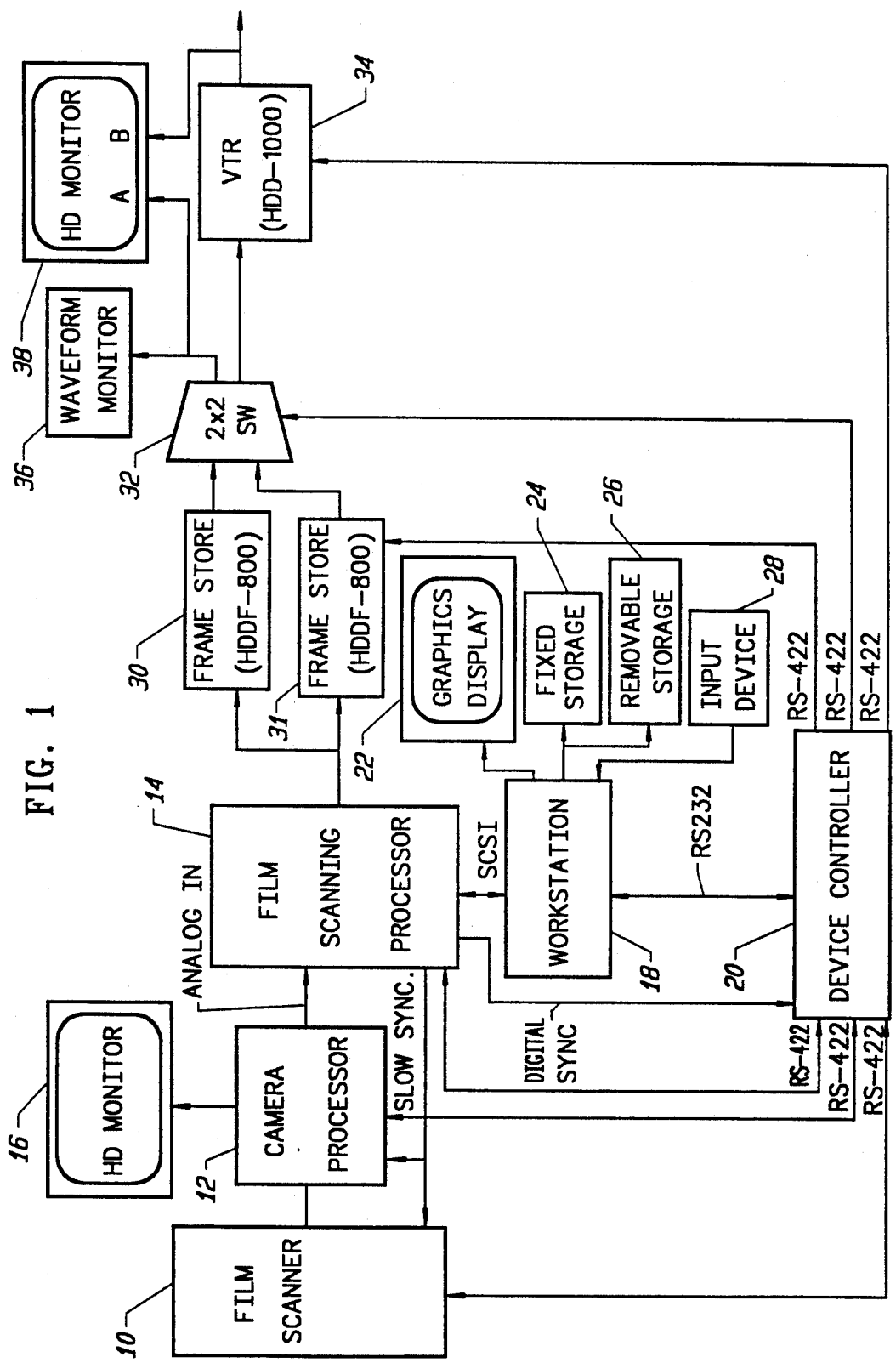
FIG. 1 is a block diagram of a film to video conversion system, in which the invention may be embodied.

The apparatus of the invention can be embodied in the apparatus disclosed in each of the following patent applications, each assigned to the assignee of the present application: "Non-Real-Time Film Scanning System," by P. Capitant, D. Hodgson, and V. Perry, filed Aug. 7, 1991, Ser. No. 07/741,329; "Method and Apparatus for Flare Correction," by D. Hodgson and Y. Levy, filed Aug. 19, 1991 Ser. No. 07/746,928; "Digital Color Correction System and Method," by P. Capitant, V. Perry, and K. Swamy, filed Jun. 5, 1991 Ser. No. 07/710,704; "Film-to-Video Frame Image Conversion Apparatus and Method for Selectively Identifying Video Fields and Frames," by P. Capitant, D. Hodgson and V. Perry, Serial No. 07/699,928, filed May 14, 1991; "Digitized Film Image Processing System with Bordered Split Screen Display," by P. Capitant, D. Hodgson, and V. Perry, filed Aug. 5, 1991 Ser. No. 07/740,626; and "Digital Video Processing System with Mixer Prefilter," by D. Hodgson, filed Jul. 25, 1991 Ser. No. 07/736,006. The specification of each listed application is incorporated herein by reference.

We contemplate that the invention may be embodied in a film scanning and processing system of the type shown in FIGS. 1-3 and 5-9. The system of FIG. 1 includes film scanner 10 and camera processor 12. Film scanner 10 transports motion picture film (color or black and white) past camera processor 12, which includes a video camera and related analog video signal processing circuitry. Camera processor 12 images each film frame adjacent to it, and generates an analog signal representing each film frame.

In a preferred embodiment, the motion picture film is imaged by camera processor 12 at a rate of 1.875 frames per second ("1.875 fps"), as scanner 10 transports the film past camera processor 12 at that rate (1.875 fps). Camera processor 12 generates analog high definition video signals, preferably having SMPTE-240M format.

The analog output of camera processor 12 is supplied to film scanning processor 14, and is optionally also displayed on monitor 16. Within film scanning processor 14, the analog video signals from camera processor 12 are digitized, and various digital signal processing operations (to be discussed in detail below with reference to FIGS. 2-6) are performed on the digitized video data. The flare correction method of the invention is preferably implemented by circuitry (to be discussed in detail below with reference to FIG. 4) within processor 14. Color correction will typically also be performed by circuitry (to be discussed in detail below with reference to FIG. 6) within processor 14.

Computer 18 interfaces with, and controls processor 14 and device controller 20. In response to user commands sent from computer input device 28 to computer 18, computer 18 instructs processor 14 to perform signal processing operations selected by the user, and computer 18 instructs controller 20 to send user-selected control signals to processor 12, scanner 10, frame storage units 30 and 31, 2×2 switch 32, and video recording and playback unit 34.

In a preferred embodiment, computer 18 is a workstation (such as a NEWS 1850 workstation, available from Sony Corporation) connected by an SCSI interface to processor 14, computer 18 is connected by an RS232 interface to controller 20, and computer 18 is connected by an RS422 interface to processor 12, scanner 10, frame storage units 30 and 31, switch 32, and video recording and playback unit 34. In one preferred embodiment, units 30 and 31 are Model HDDF-500 high definition video frame store units available from Sony Corporation, and recording and playback unit 34 is a Model HDD-1000 high definition video recorder available from Sony Corporation.

Also connected to computer 18 are fixed data storage means 24 (which may be a hard disk drive) and removable data storage means 26 (which may be a floppy disk drive), and graphics display 22 (preferably, a high resolution color graphics display).

Preferably, computer input device 28 includes a touch tablet for finger selection of menu items and icons displayed on monitor 22, a trackball for selecting color and image areas displayed on monitor 22, and a keyboard for entering text, user notes, and processing parameters.

After the digitized video data are processed digitally in processor 14, the processed data are stored on a frame-by-frame basis in frame stores 30 and 31. Switch 32, under control of controller 20, connects desired ones of frame stores 30 and 31 to video recording and playback unit 34 and to waveform monitor 36 and video monitor 38 (which is preferably a high definition video monitor). To maximize the system's throughput rate, as a frame of data is read out (or multiple frames of data are read out) from one of frame stores 30 and 31, the next frame (or multiple frames) of data should simultaneously be written into the other one of frame stores 30 and 31. In such an operating mode, switch 32 connects alternating ones of frame stores 30 and 31 to unit 34 (and optionally also to monitors 36 and 38).

Figure 2:
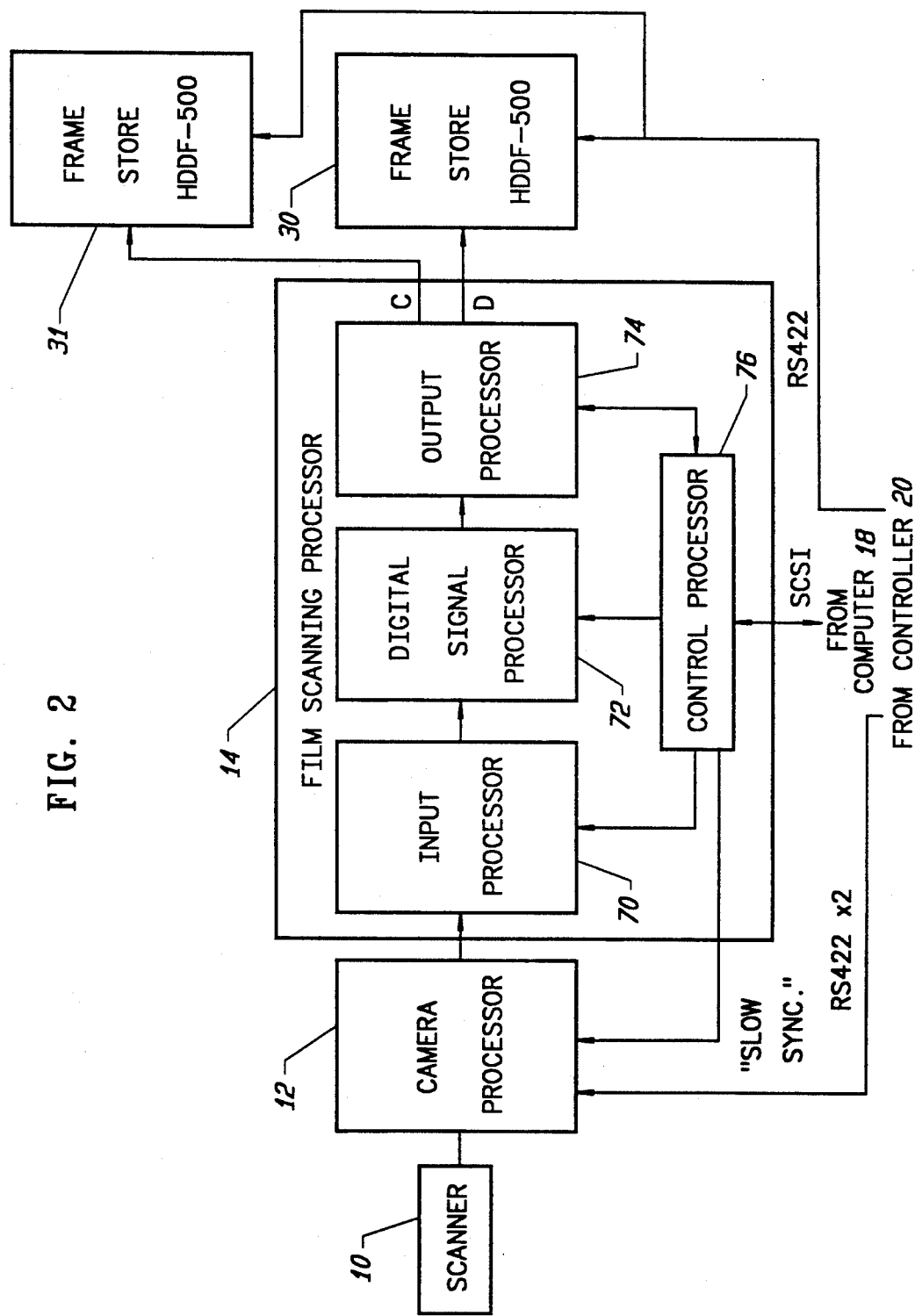
FIG. 2 is a block diagram of a portion of the FIG. 1 system.

The preferred embodiment of film scanning processor 14 shown in FIG. 2 includes input processor 70 (which receives the analog output of camera processor 70), digital signal processor 72, output processor 74, and control processor 76. Input processor 70 digitizes the analog input signal, performs preliminary corrections on the resulting digitized data, and supplies the preliminarily processed digitized data to digital signal processor 72 for color correction. The color corrected data generated in processor 72 are supplied through output processor 74 to frame stores 30 and 31. Processors 70, 72, and 74 operate under control of control processor 76, which in turn receives instructions from computer 18 over an SCSI interface.

In one class of embodiments, control processor 76 generates a synchronization signal for reading out (discharging) an image sensor means within camera processor 12. Preferably, the image sensor means is read out at a low rate (such as 1.875 fps) in response to a correspondingly low rate synchronization signal ("slow sync") from processor 76.

Figure 3:
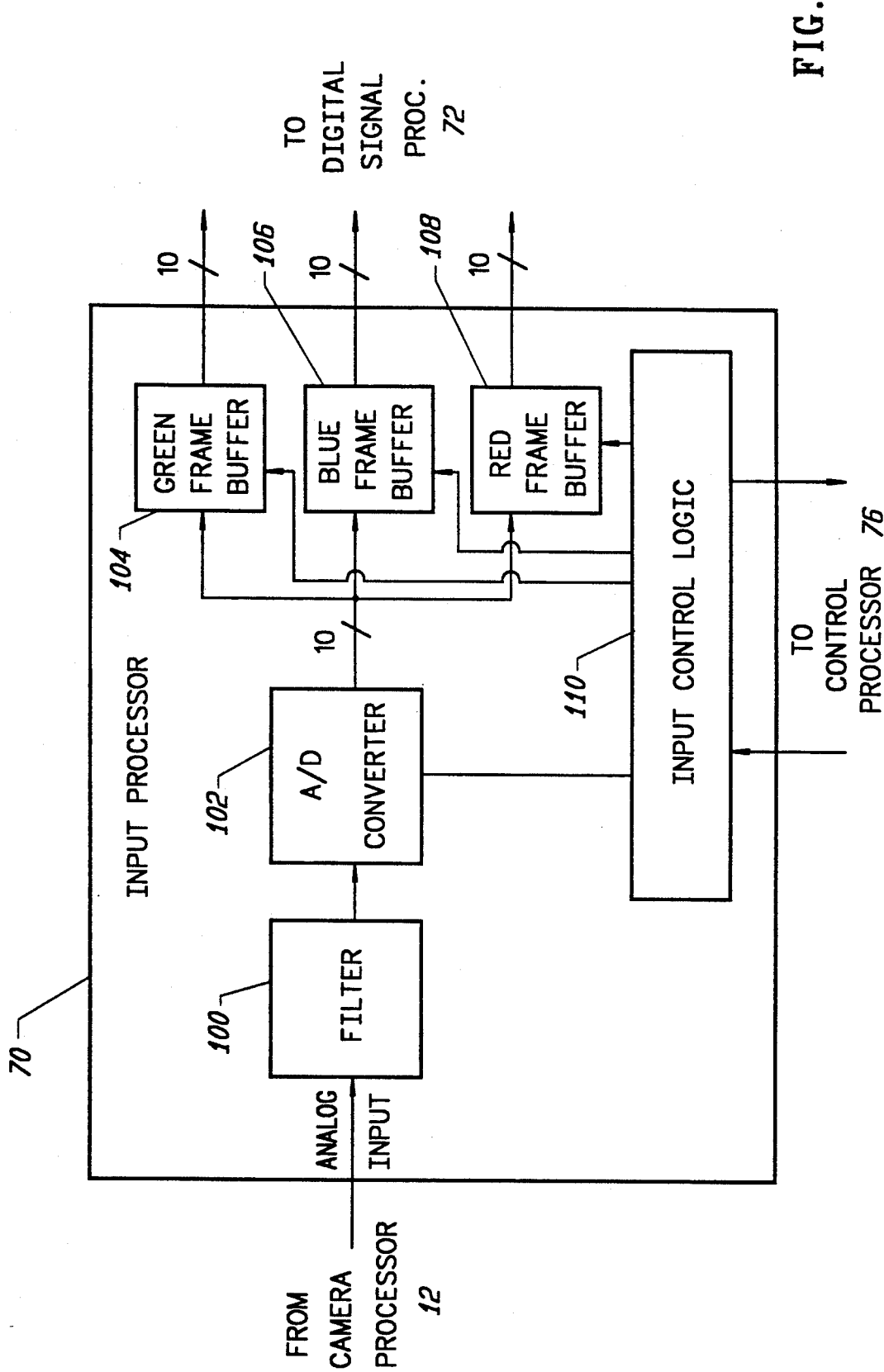
FIG. 3 is a block diagram of the input processor shown in FIG. 2.

A preferred embodiment of input processor 70 is shown in FIG. 3. The analog input signal supplied to processor 70 consists of frames, each comprising 2200×1125 pixels. Each frame consists of 1125 lines, including lines comprising an even field and an odd field, and ninety lines which comprise a vertical blanking interval containing synchronization information. There are 1920 pixels of active video per line, with the remaining 280 pixels per line comprising the horizontal blanking interval.

The analog input signal is supplied from camera processor 12 (preferably over a 75 ohm coax cable) to filter/amplifier circuit 100. Circuit 100 includes an amplifier for amplifying the analog input signal, circuitry for separating the sync and video portions of the input signal, and a low pass filter for filtering the video portion of the input signal to enhance resolution during digitization. In one embodiment, the cutoff frequency of the low pass filter within circuit 100 is about 7.5 MHz, with the filter having a flat frequency response from 0 to 7.5 MHz, and the frequency response of the filter declining in a steep slope from 7.5 MHz to 9.3 MHz.

The amplified, low-pass-filtered analog output from filter 100 is digitized in analog-to-digital conversion circuit 102. In a preferred embodiment, circuit 102 implements 10-bit quantization, in which case the digital data generated by circuit 102 will comprise ten parallel digital data streams. In order to perform 10-bit quantization with a relatively simple, inexpensive analog-to-digital conversion circuit 102, we prefer that the output frame rate of camera processor 12 should equal 1.875 fps. When the output frame rate of camera processor 12 is 1.875 fps, the digital data emerging from circuit 102 has a data rate of 18.56 MHz (one fourth the proposed real-time SMPTE-240M high definition digital video clock rate, 74.25 MHz).

The digital video data generated by A/D converter 102 are supplied to green frame buffer 104, blue frame buffer 106, and red frame buffer 108. The output of camera processor 12 is time division multiplexed, typically in the following sequence: two fields of blue data, then two fields of green data, then two fields of red data, and finally two fields of gray data. Input control logic circuitry 110 (operating under control of control processor 76) causes frames of blue digital data ("$B_{in}$"), green digital data ("$G_{in}$"), and red digital data ("$R_{in}$") from A-to-D converter 102 to be written sequentially (on a frame-by-frame basis) into buffer 106, then into buffer 104, and next into buffer 108. The gray frames are not normally written into any of buffers 104, 106, and 108.

Blue, green, and red data are written sequentially into buffers 104, 106, and 108 at the source rate (typically, 1.875 frames per second). Blue, green, and red data are read out in parallel from buffers 104, 106, and 108 (to produce three parallel data streams, each representing a different 10-bit color channel) at four times the source rate. Thus, each color channel output from buffers 104, 106, and 108 typically has a frame rate of 7.5 frames per second (one fourth of the proposed standard SMPTE-240M digital video frame rate). In order to achieve the described four-fold increase in frame rate, each bit written into one of buffers 104, 106, and 108, is read out four times from that buffer.

Preferably, each of buffers 104, 106, and 108 is a double buffer, including a first memory, and a second memory into which data can be written while data (previously written into the first memory) is read from the first memory.

As mentioned, the gray frames are not normally written into any of buffers 104, 106, and 108. However, in one class of embodiments, the system has an optional operating mode in which gray frames are read from input processor 70 at four times the source rate at which they are supplied to processor 70. In one such embodiment, a double gray frame buffer is connected in parallel with buffers 104, 106, and 108. One memory within the double gray frame buffer is filled while the other memory therein is read (at four times the source rate) to processor 72. In another of such embodiments, the gray frames (rather than the red, green, and blue frames) are read into one or more of buffers 104, 106, and 108.

Figure 4:
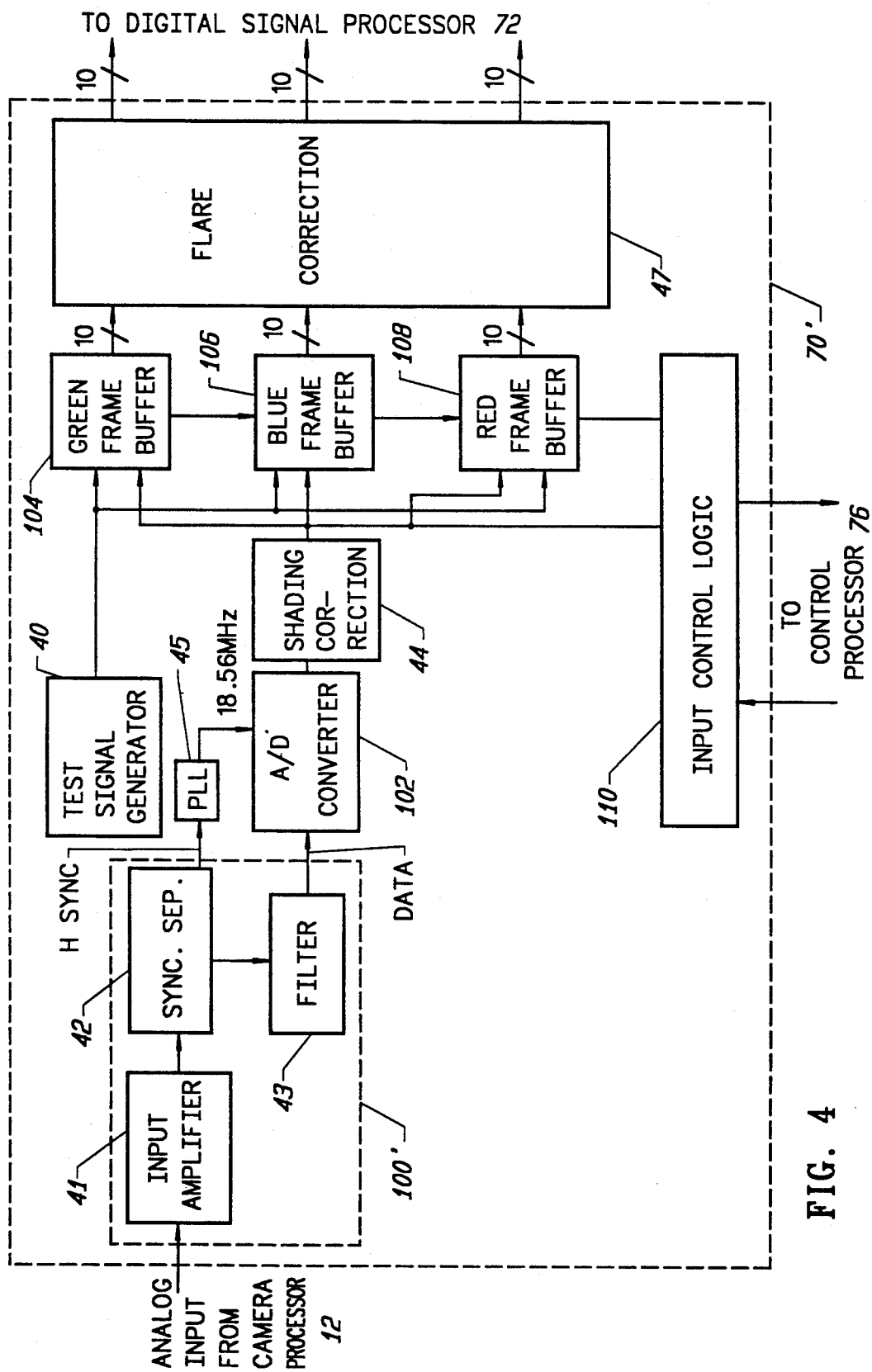
FIG. 4 is a block diagram of an alternative preferred embodiment of the input processor shown in FIG. 2.

In the embodiment of FIG. 4, input processor 70' includes means for performing shading correction on the digital output of A-to-D converter 102. Preferably, the shading correction is performed before the flare correction is performed on the data. In order to perform shading correction, a set of shading correction signals must be generated. In contrast with flare correction signals which compensate for undesired luminance variation due to optical scatter from frame to frame within each color channel, the shading correction signals compensate for undesired luminance variation within each frame.

The shading correction signals are preferably generated in the following manner. Camera processor 12 and input processor 70' (or input processor 70 of FIG. 2) are operated to generate red, green, and blue digital data collectively representing a "black" motion picture frame. This is conveniently accomplished by positioning a lens cap over the lens of the camera within unit 12, and then operating unit 12 to generate a red frame of data, a green frame of data, and a blue frame of data. The average luminance of each frame is then computed. Then, for each frame, the difference is computed between the luminance of each pixel of the frame, and the frame's average luminance. These difference signals (scaled by a preselected constant factor) are employed as red, green, and blue shading correction signals.

In one class of embodiments, each of frame buffers 104, 106, and 108 includes two memory blocks, each having 1M×12 bit capacity. Each 1M×12 bit block includes three commercially available 1M×4 bit memory circuits. However, in a preferred embodiment within this class, only the ten most significant bits of the data are utilized (in the sense that each pixel read from any of buffers 104, 106, and 108, consists of ten parallel bits).

A preferred embodiment of an input processor which includes flare correction, shading correction, and lift variation correction circuitry will next be described with reference to FIG. 4. Input processor 70' of FIG. 4 is identical to input processor 70 of FIG. 3 except in the following respects. The analog input signal is supplied from camera processor 12 (preferably over a 75 ohm coax cable) to filter/amplifier circuit 100. Circuit 100 includes input amplifier 41, sync separation circuit 42 for separating the horizontal sync, vertical sync, and video data portions of the input signal, and low pass filter 43 for filtering the video data portion of the input signal to reduce aliasing. In one embodiment, the cutoff frequency of low pass filter 43 is about 7.5 MHz, with the filter having a flat frequency response from 0 to 7.5 MHz, and the frequency response of the filter declining in a steep slope from 7.5 MHz to 9.3 MHz.

The amplified, low-pass-filtered analog data stream output from filter 43 is digitized in analog-to-digital conversion circuit 102. In a preferred embodiment, the H Sync signal from sync separation circuit 42 is multiplied by 2200 in phase-locked loop 45 to generate an 18.56 MHz clock signal, and this 18.56 MHz clock signal is supplied to A-to-D conversion circuit 102, wherein it is employed to sample the input analog data at a data rate of 18.56 MHz.

In one operating mode, the digital video data generated by A-to-D converter 102 are supplied directly to green frame buffer 104, blue frame buffer 106, and red frame buffer 108 at the source rate (typically, 1.875 frames per second). Blue, green, and red data are read out in parallel from buffers 104, 106, and 108 (to produce three parallel data streams, each representing a different 10-bit color channel) at four times the source rate. In order to achieve the described four-fold increase in frame rate, each bit written into one of buffers 104, 106, and 108, is read out four times from that buffer.

In the normal operating mode, the digital data from A-to-D converter 102 are supplied to circuit 44, for shading correction. The corrected red, green, and blue frames output from correction circuit 44 are written sequentially into frame buffers 104, 106, and 108.

In an alternative operating mode of input processor 70', data from test signal generator 40 (rather than correction circuit 44) are written sequentially into frame buffers 104, 106, and 108.

The green, blue, and red data streams read out from frame buffers 104, 106, and 108 undergo flare correction (and optionally also lift correction) in circuit 47. The corrected green, blue, and red data streams asserted at the output of circuit 47 undergo further processing in digital signal processor 72 (shown in FIGS. 2 and 5).

Figure 5:
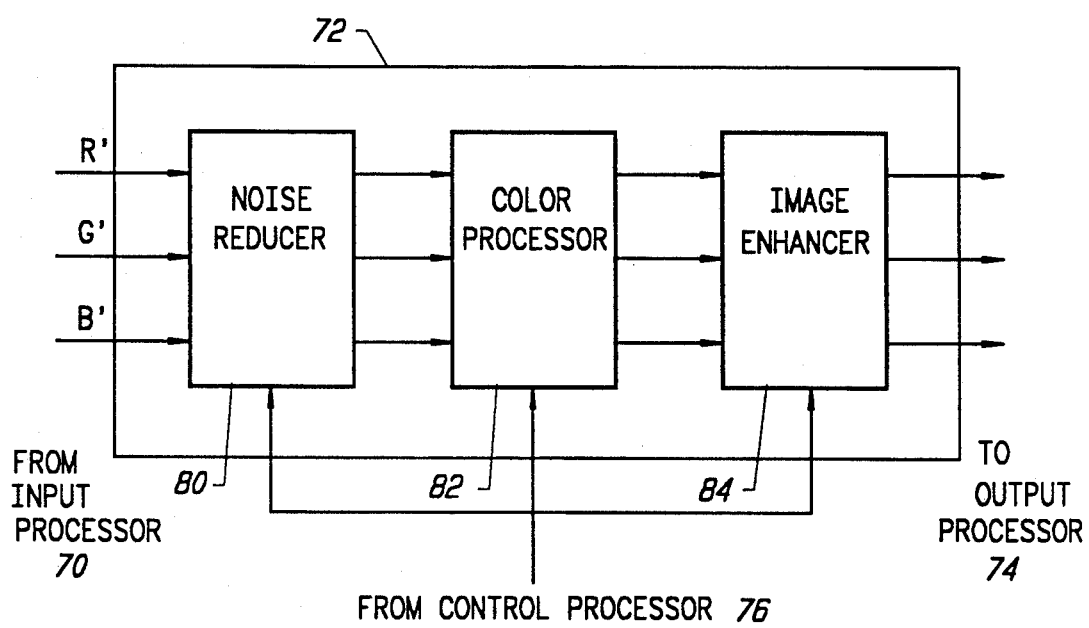
FIG. 5 is block diagram of the digital signal processor shown in FIG. 2.

The preferred embodiment of digital signal processor 72 shown in FIG. 5 includes a noise reduction circuit 80, which receives the data streams supplied from frame buffers 104, 106, and 108 of input processor 70 of FIG. 3 (or from flare correction circuit 47 of input processor 70' of FIG. 4). Noise reduction circuit 80 should include a circuit for reducing film noise (including film grain noise and scratches) and image pick-up system noise (including noise relating to the system's optics and image sensor, as well as associated electronic noise).

As indicated in FIG. 5, the output of noise reduction circuit 80 undergoes digital color correction in color processor 82, and then digital image enhancement in image enhancement circuit 84. Preferably, digital signal processor 72 processes the digital data at an internal processing rate substantially greater than the scanning rate of camera processor 12. For example, if the scanning rate is 1.875 fps, the internal processing rate of processor 72 may desirably be about 8 fps.

Figure 6:
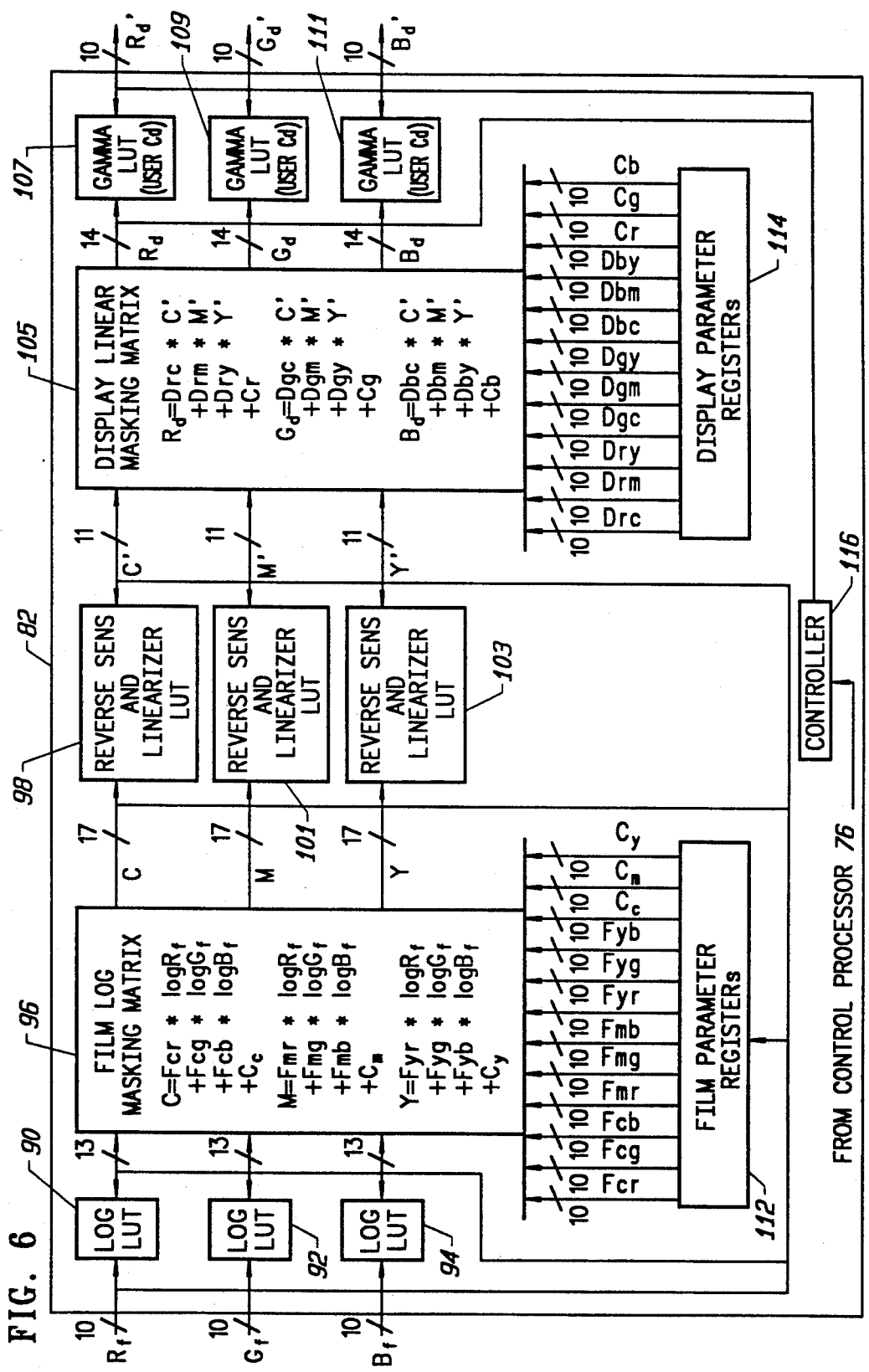
FIG. 6 is block diagram of the color processor shown in FIG. 5.

FIG. 6 is a preferred embodiment of color processor 82. The FIG. 6 apparatus is designed to perform a limited type of color transformation, namely the transformation of the colors of the digitized images generated by camera processor 14 (as a result of scanning motion picture film) into colors that would have been generated if the subject had been imaged directly by a video camera (i.e., without intermediate filming and film scanning steps). If desired, a more complicated and versatile color correction means, for example a "paint" system having the capability to perform a wide range of color transformations, may be substituted for the apparatus of FIG. 6.

The FIG. 6 apparatus includes a film transform section and a display transform section. The film transform section includes logarithm look-up tables 90, 92, and 94, masking matrix 96, parameter registers 112, and "reverse sensitometry and linearizing" look-up tables 98, 101, and 103. Display transform section includes masking matrix 105, parameter registers 114, and gamma function look-up tables 107, 109, and 111.

A logarithm operator is applied to each of the red, green, and blue 10-bit input pixels in look-up tables 90,

92, and 94, to generate a 13-bit value for each 10-bit input pixel. More particularly, logarithm look-up tables 90, 92, and 94 compute the logarithms of the red, green, and blue input pixels, by multiplying them by pre-stored log transformation parameters to generate 13-bit log domain output data.

Masking matrix 96 transforms the log domain data asserted at the outputs of look-up tables 90, 92, and 94 to correct for crosstalk between film dyes, interlayer inter-image effects, and the effects of colored coupler masking as seen by camera processor 14. Masking matrix coefficients $F_{cr}$, $F_{cg}$, $F_{cb}$, $F_{mr}$, $F_{mg}$, $F_{mb}$, $F_{yr}$, $F_{yg}$, and $F_{yb}$, and parameters $C_c$, $C_m$, and $C_y$, are determined by the spectral absorption of the film dyes and the spectral sensitivity of camera processor 14's image pickup system, and are stored in registers 112 in response to control signals supplied from controller 116 (in response to control signals from control processor 76). The data pixels asserted at the outputs of masking matrix 96 are proportional to equivalent cyan, magenta, and yellow film densities, and hence are grouped into the channels labeled "C", "M", and "Y".

The equivalent dye densities are related in a well-known manner to selective film exposures by sensitometric and characteristic curves. For this reason, the "cyan" data generated in masking matrix 96 undergoes gamma correction and reverse sensitometry processing, as well as inverse-log transformation in look-up table 98. Similarly, the "magenta" data generated in masking matrix 96 undergoes gamma correction, reverse sensitometry, and inverse-log transformation in look-up table 101, and the "yellow" data generated in masking matrix 96 undergoes gamma correction, reverse sensitometry, and inverse-log transformation in look-up table 103.

Display section linear masking matrix 105 next transforms the linear domain data asserted at the outputs of look-up tables 98, 101, and 103 to compensate for the overall non-ideal spectral characteristics of the system as a whole (including the motion picture film being scanned, camera processor 14, and monitor 38). The masking matrix coefficients $D_{rc}$, $D_{rm}$, $D_{ry}$, $D_{gc}$, $D_{gm}$, $D_{gy}$, $D_{bc}$, $D_{bm}$, and $D_{by}$, and parameters $C_r$, $C_g$, and $C_b$, that are employed to process the CMY data pixels in display linear masking matrix 105 are stored in parameter registers 114.

Masking matrix coefficients $D_{rc}$, $D_{rm}$, $D_{ry}$, $D_{gc}$, $D_{gm}$, $D_{gy}$, $D_{bc}$, $D_{bm}$, $D_{by}$, $F_{cr}$, $F_{cg}$, $F_{cb}$, $F_{mr}$, $F_{mg}$, $F_{mb}$, $F_{yr}$, $F_{yg}$, and $F_{yb}$, and parameters $C_r$, $C_g$, $C_b$, $C_c$, $C_m$, and $C_y$ are preferably selected by the user in the following manner. A test frame, from a sample of motion picture film of the same type as the film to be color-corrected, is scanned. Output processor 74 generates a composite video signal (in a manner to be explained in greater detail below) by combining portions of the test frame and a comparable reference frame. Monitor 38 displays the composite signal as a split screen image (with complementary portions of the test frame and the reference frame in distinct regions of the split screen). To generate the composite signal, control processor 76 reads out the reference frame from one of frame stores 120-127 under the control of computer 18.

While viewing the test frame and the reference frame, the user selects the processing coefficients and parameters interactively (by entering commands to input device 28 in response to menus displayed on computer graphics monitor 22) to achieve a desired visual appearance of the two displayed images.

In a variation on this procedure, the user selects a set of processing coefficients and parameters for each of a number of selected motion picture film frames (preferably using different corresponding pre-stored reference frames for each selected motion picture film frame), and computer 18 downloads each selected set of coefficients and parameters through control processor 76 and controller 116 at appropriate times to registers 112 and 114. Computer 18 also automatically generates coefficients and parameters for intermediate film frames (i.e., film frames for which the user did not specifically select coefficients and parameters) by employing an interpolation technique, and downloads these interpolated coefficients and parameters (at appropriate times) to registers 112 and 114.

After the data pixels asserted at the outputs of look-up tables 98, 101, and 103, are processed in display linear masking matrix 105, they are proportional to red, green, blue HDVS high definition video pixels and hence are grouped into the channels labeled "$R_d$", "$G_d$", and "$B_d$". Each of the $R_d$, $G_d$, and $B_d$ data streams is processed in a corresponding one of gamma function look-up tables 107, 109, and 111, to compensate for the nonlinear characteristics of the display monitor. In one class of embodiments, each of circuits 107, 109, and 111 is implemented as a single look-up table comprising a read-only memory which stores a set of transform parameters to be applied to all input pixels in the relevant RGB channel.

However, an implementation employing a single look-up table for each RGB channel may undesirably introduce aliased data components into the data which cannot practically be subsequently removed.

Accordingly, we prefer to implement each of circuits 107, 109, and 111 (and each of circuits 90, 92, 94, 98, 101, and 103) as a set of N parallel look-up tables (each for applying a different term of an N-degree polynomial to the data) with a low-pass filter for pre-filtering the input data supplied to each look-up table. In this preferred embodiment, the data supplied to each look-up table are pre-filtered in the corresponding filter to eliminate high frequency components of the data which would otherwise introduce aliased signal components into the output of the look-up table. Within each color channel, each low-band-pass filter preferably passes a different frequency band, with the cut-off frequencies for the filters corresponding to higher-order polynomial terms exceeding the cut-off frequencies for the filters for lower-order polynomial terms.

Figure 7:
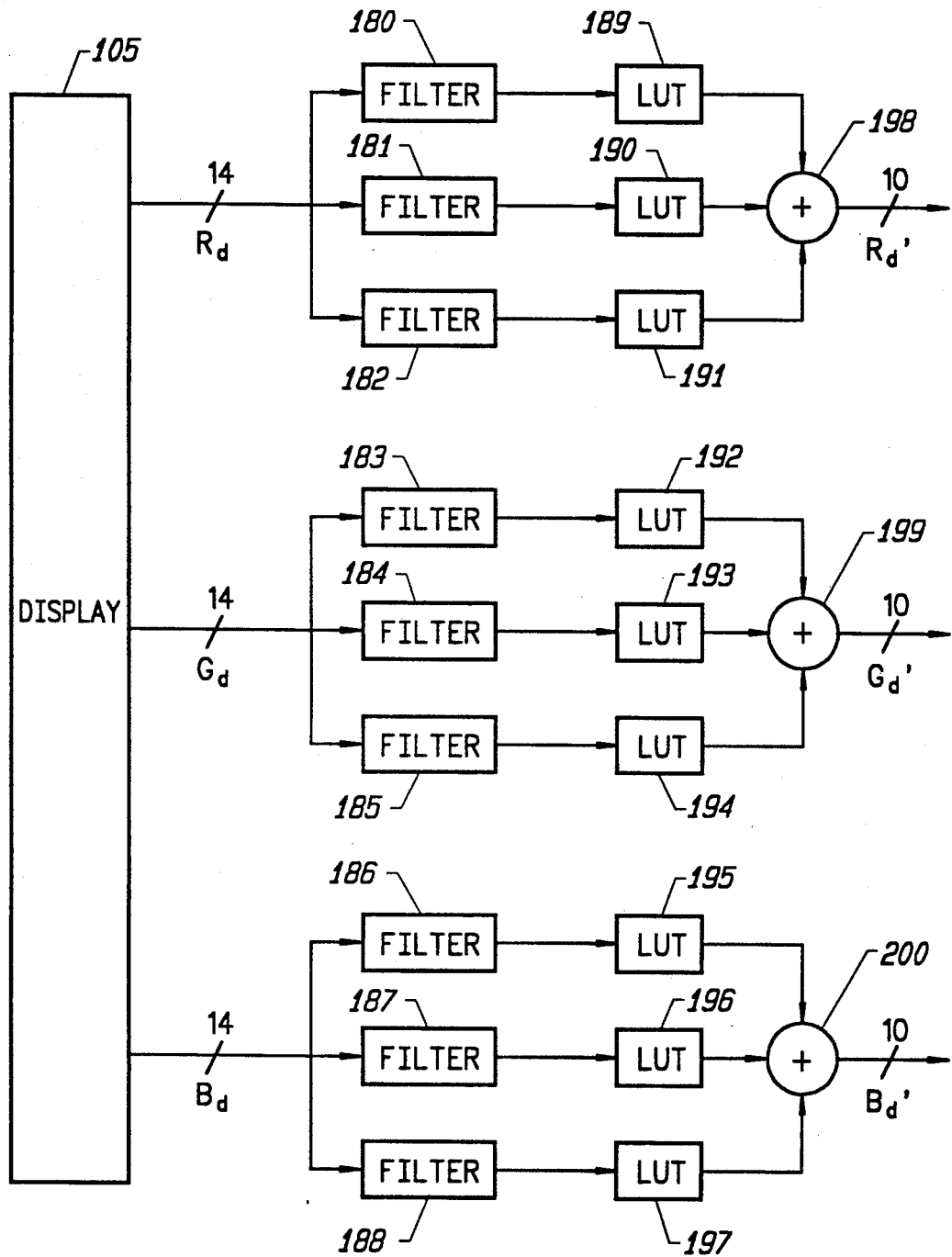
FIG. 7 is a block diagram of a preferred embodiment of the invention.

FIG. 7 is a preferred embodiment of the embodiment described in the previous paragraph. The circuit of FIG. 7 includes linear masking matrix 105, low-band-pass filters 180 through 188, and look-up tables 189 through 197. Typically, the same gamma transform is implemented in each color channel, and the circuitry for each color channel is identical (i.e., filters 180, 183, and 185 are identical, filters 181, 184, and 187 are identical, circuits 189, 192, and 195 are identical, circuits 190, 193, and 196 are identical, and so on). Of course, in order to implement a different gamma transform within each color channel, the circuitry for each color channel will not be identical.

Consider first the red channel circuitry, which consists of circuits 180-182 and 189-191. Each of look-up table circuits 189-191 implements a different polynomial term of a selected gamma transformation function (selected to compensate for nonlinear characteristics of the system's display monitor), so that circuits 189-191 together correspond functionally to circuit 107 of FIG. 6.

In general, each gamma transformation has a power series expansion and may be approximated by the lowest N polynomial terms of the expansion. For some applications it is sufficient to implement the gamma transformation using only the three lowest order terms. For example, the FIG. 7 circuit implements the three lowest order terms of a gamma transformation using table 189 which implements the first order (linear) term, table 190 which implements the second order term, and table 190 which implements the third order term. In alternative embodiments of the invention, a gamma correction transformation is implemented using two, or more than three polynomial terms.

Typically, circuits that implement different order terms of a transformation (such as a gamma transformation) will introduce different degrees of aliasing error into the same input data stream. In accordance with the invention, such aliasing error is avoided by prefiltering the input data to each circuit employed to implement a term of a color transformation, to remove frequency components from the input data which would otherwise give rise to aliasing.

In the FIG. 7 embodiment, the 14-bit parallel "red" input data stream, $R_d$, from circuit 105 is supplied to parallel low-pass-filters 180, 181, and 182. Filter 180 removes frequency components above frequency "f/2" from the red data stream, where "f" is the clock rate of look-up table 189 (and of look-up tables 190 and 191). Filters 181 and 182 should remove frequency components above frequencies f/4 and f/6, respectively, from the red data stream.

In one preferred embodiment, clock frequency "f" is equal to 18.56 MHz.

Similarly, the 14-bit parallel "green" and "blue" input data streams, $G_d$ and $B_d$, from circuit 105 are supplied to parallel low-pass-filters 183-185 and 186-188, respectively. Filters 183 and 186 remove frequency components above frequency "g/2" and "h/2" from the data streams input to each, where "g" is the clock rate of look-up table 192, 193, and 194, and "h" is the clock rate of look-up table 195, 196, and 197. Filters 184, 185, 187, and 188 should remove frequency components above frequencies g/4, g/6, h/4, and h/6, respectively, from the green and blue data streams.

The outputs of circuits 189, 190, and 191 are combined in addition circuit 198 to produce 10-bit parallel corrected red data stream $R_d'$. Similarly, the outputs of circuits 192, 193, and 194 are combined in addition circuit 199 to produce 10-bit parallel corrected green data stream $G_d'$, and the outputs of circuits 195, 196, and 197 are combined in addition circuit 200 to produce 10-bit parallel corrected blue data stream B'.

It is also within the scope of the invention to implement the look-up table assembly comprising tables 90, 92, and 94 (or the look-up table assembly comprising tables 98, 101, and 103, or both such assemblies) as a circuit having the same structure as the circuit consisting of components 180-200 described above with reference to FIG. 7. Of course, such assemblies would not implement gamma transformation functions (as does the FIG. 7 circuit), but would instead implement other polynomial transformation functions.

The output of color processor 82 (or the output of addition circuits 198, 199, and 200, in systems including the circuit of FIG. 7) preferably undergoes image enhancement in image enhancement circuit 84 prior to subsequent processing in output processor 74. Image enhancement means 84 preferably performs both edge enhancement and softening. In alternative versions of digital signal processor 72 shown in FIG. 5, noise reduction means 80 or image enhancement means 84 (or both means 80 and means 84) are omitted.

Figure 8:
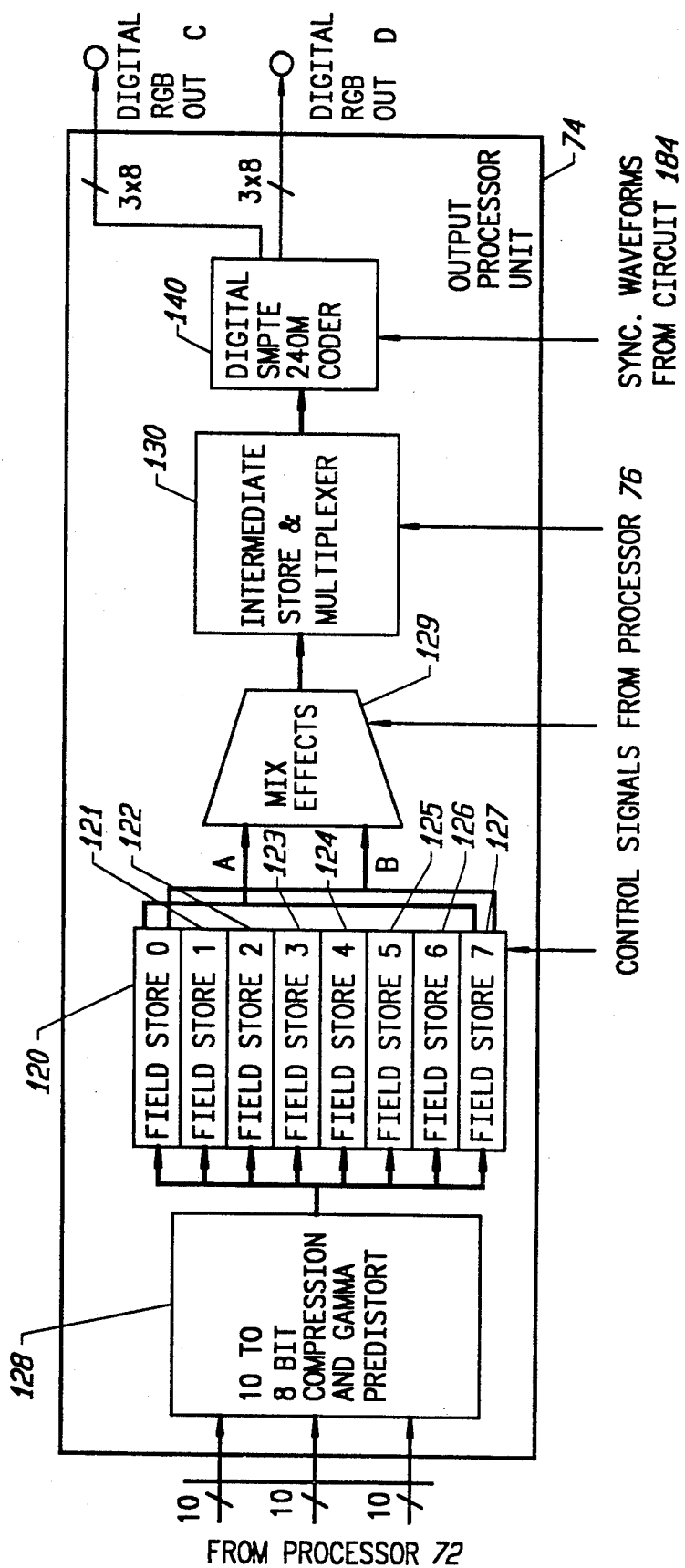
FIG. 8 is block diagram of the output processor shown in FIG. 2.

The preferred embodiment of output processor 74 shown in FIG. 8 includes compression circuit 128, which receives digitized frames of 10-bit parallel data from digital signal processor 72, and compresses the 10-bit parallel data stream into an 8-bit parallel data stream. The 8-bit data stream is written into a selected sequence of assembly field stores 120-127 in response to control signals supplied from control processor 76 to the field stores 120-127 (only one of field stores 120-127 receives data at a time). One or more digitized reference fields (typically, two reference fields which comprising a reference frame) are also stored in selected ones of field stores 120-127.

Five of field stores 120-127 are required to perform the 3-2 pulldown scanning process to be described below. Typically, two of field stores 120-127 are employed to store reference fields which comprise a reference frame.

Compression circuit 128 optionally also includes circuitry for performing display gamma predistortion on the 8-bit parallel data before the data are written into field stores 120-127.

As indicated in FIG. 8, data may be read from any two of field stores 120-127 in parallel, to produce two 8-bit parallel digital data streams A and B (for each color channel). In one typical case, data stream A represents a color-corrected motion picture film frame from digital signal processor 72, and data stream B represents a reference video frame prestored in the field stores.

Data are written into (and read out from) field stores 120-127 in response to control signals from processor 76. In one embodiment, a 3-2 pulldown process is implemented to write data from the field stores. Such a 3-2 pulldown process typically contemplates that camera processor 12 scans a motion picture film at a frame rate of (24/N) fps, where N is an integer, as the film advances through scanner 10 at the same rate (24/N fps). In one embodiment, N=16, so that camera processor 12 generates video frames at a rate of 1.5 frames per second. In this embodiment, digital data are read from input processor frame stores 104, 106, and 108 at the rate of 6 frames per second (12 fields per second), and written into field stores 120-127 at the same rate (12 fields per second).

Circuit 128 includes means for demultiplexing each frame of data it receives into its constituent odd $f_O$ and even $f_E$ fields, so that individual even or odd fields can be selectively written into fields stores 120-127. In general, to implement the 3-2 pulldown process, individual fields are written sequentially into field stores 120-127, and different sequences of fields (including some duplicate odd $f_{OD}$ and even $f_{ED}$ fields) are read from the field stores (at a higher field rate) to produce frames of output video data. Each frame of output video data includes one odd $f_O$ and one even $f_E$ field. In one embodiment, fields are written into field stores 120-127 at the rate of 12 fields per second, and are read out from fields stores 120-127 at the rate of 15 fields per second.

For example, in response to control signals from processor 76, fields can be written from circuit 128 into selected ones of field stores 120-127 in the following sequence: during a first timing cycle, fields $F_1 f_O$ and $F_1f_E$ of the first input frame $F_1$, are written into field stores 120 and 121, respectively. During the next timing cycle, the two fields comprising the second input frame $F_2$ are written into field stores 122 and 123, respectively. Similarly, during subsequent timing cycles, subsequent input frames $F_N$ are written into selected pairs of field stores 120-124, or reference fields are written into field stores 125-126.

During the first output timing cycle, fields $F_1f_O$ and $F_1f_E$ corresponding to the first input frame $F_1$ are read from field stores 120 and 121. During the second output timing cycle, the odd field from the first input frame is output again as a duplicate field $F_1f_{OD}$, along with the even field $F_2f_E$ of the second input frame $F_2$. Subsequent fields are similarly output (for example, in the sequence described in detail in the above-referenced patent application entitled "Film-to-Video Frame Image Conversion Apparatus and Method for Selectively Identifying Video Fields and Frames," by P. Capitant, D. Hodgson and V. Perry, Ser. No. 07/699,928, filed May 14, 1991.

Rate conversion (for example, from the rate of 12 fields per second to the rate of 15 fields per second) is thus achieved by reading out stored fields repeatedly from selected ones of stores 120-127. In one embodiment, data are read from field stores 120-127 at a rate of 60 fields per second (30 fps), and processed in circuit 129, written into circuit 130, and read out from circuit 130 at that rate (30 fps). In another embodiment, data are read from field stores 120-127 at a rate of 15 fields per second (7.5 fps), processed in circuit 129 and written into circuit 130 at the rate of 7.5 fps, but read out from circuit 130 at the rate of 30 fps.

The digital video data stream asserted at the output of circuit 129 includes "artificial" frames comprising even and odd fields from different input frames). Such artificial frames may interfere with subsequent processing of each digital video signal output from processor 74.

Digital data streams A and B from field stores 120-127 are supplied to the two inputs of "mixing and effects" circuit 129. The mix source of circuit 129 may be a constant value (to achieve a "fade" between sources A and B). Circuit 129 preferably has an onboard wipe generation circuit, and means for generating a composite video signal from data streams A and B for display as a split screen image in which a portion of the "A" image, and a complementary portion of the "B" image, occupy distinct regions of a monitor screen. The wipe generator means within circuit 129 generates rectangular wipes of any size within the output raster, may be switched on or off at any time in response to control signals from processor 76, and preferably inserts a border signal into the data stream in order to produce a distinctive displayed border which separates the two image regions of the displayed composite signal. Such a distinctive border helps the system user to distinguish a reference image from a test image, since often the test image differs only slightly and subtly from the reference image.

Circuit 129 preferably also includes means for inserting a conventional graphics cursor signal into the composite video digital signal produced by other circuitry within circuit 129. The cursor signal overlays a cursor region of the displayed video output from output processor 74. By operating the input device 28 to change the cursor signal, the user controls the position of the cursor in the displayed video image. In a preferred embodiment, when the displayed cursor highlights a region of a displayed video frame, the user can select color coefficients and parameters to match the highlighted region by entering appropriate commands using the input device 28.

The 8-bit parallel data streams (one 8-bit parallel stream for each of the R,G,B color channels) asserted at the output of circuit 129 is supplied to intermediate frame store circuit 130. The digital data from circuit 129 are written into circuit 130 at a first rate (typically 15 fields per second, which is 7.5 frames per second) and are read out from circuit 130 at four times the first rate (typically, 60 fields per second or 30 frames per second, the proposed standard SMPTE-240M digital video frame rate). Each bit written into circuit 130 is thus read out four times from circuit 130.

Within coding circuit 140, video synchronization signal insertion circuitry inserts conventional digital blanking, sync, and vertical interval data into the horizontal and vertical blanking intervals of the digital data read out from circuit 130. The output of circuit 140 is thus a digital video signal ready for display. Preferably, the inserted sync information is standard high definition digital video sync information (for example, it may satisfy the proposed SMPTE-240M high definition digital video standard), so that the output of circuit 140 is a standard high definition digital color video signal. The sync information is supplied to circuit 140 from an internal timing generator 182 within timing unit 190, which is in turn within control processor 76 (to be described below).

Preferably, coder 140 also inserts encoded "tagging" information into the video signal emerging from circuit 130. The tagging information can be a set of color correction or noise reduction parameters useful for performing subsequent color correction or noise reduction processing, or information which identifies artificial frames generated during the 3-2 pulldown process. Identification of the artificial frames in this manner enables subsequent processing systems (such as an EBR system which converts video signals to motion picture film images) to reject (or specially process) the artificial frames from the output of the FIG. 1 system.

The output of coder 140 is an-8-bit color digital video signal. Coder 140 asserts alternate frames of this digital video signal on output lines C and D, for storage, respectively, in frame stores 30 and 31 (shown in FIG. 1).

Figure 9:
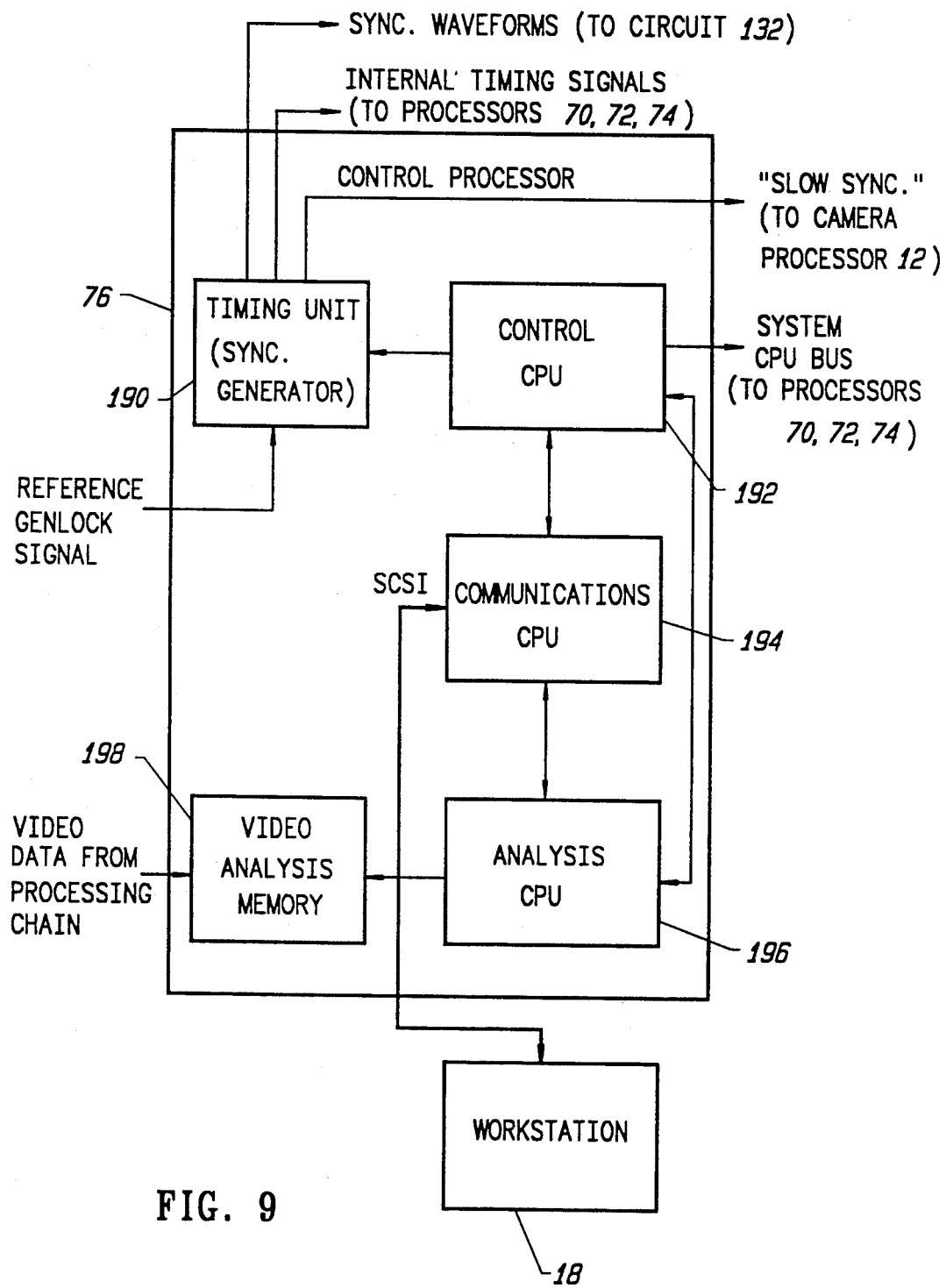
FIG. 9 is block diagram of the control processor shown in FIG. 2.

Control processor 76 of film scanning processor 14 will next be described with reference to FIG. 9. Communications CPU 194 within control processor 76 communicates with computer 18 over an SCSI interface.

The digital data being processed within film scanning processor 14 are supplied to video analysis memory 198. In response to instructions from CPU 194, a data analysis CPU 196 reads data from memory 198, analyzes the data, and sends the analysis results to CPU 194, which relays the results to computer 18.

In response to commands from CPU 194, control CPU 192 sends control signals to timing unit 190, and to the other processing boards within the film scanning processor 14 (input processor 70, digital signal processor 72, and output processor 74).

Figure 10:
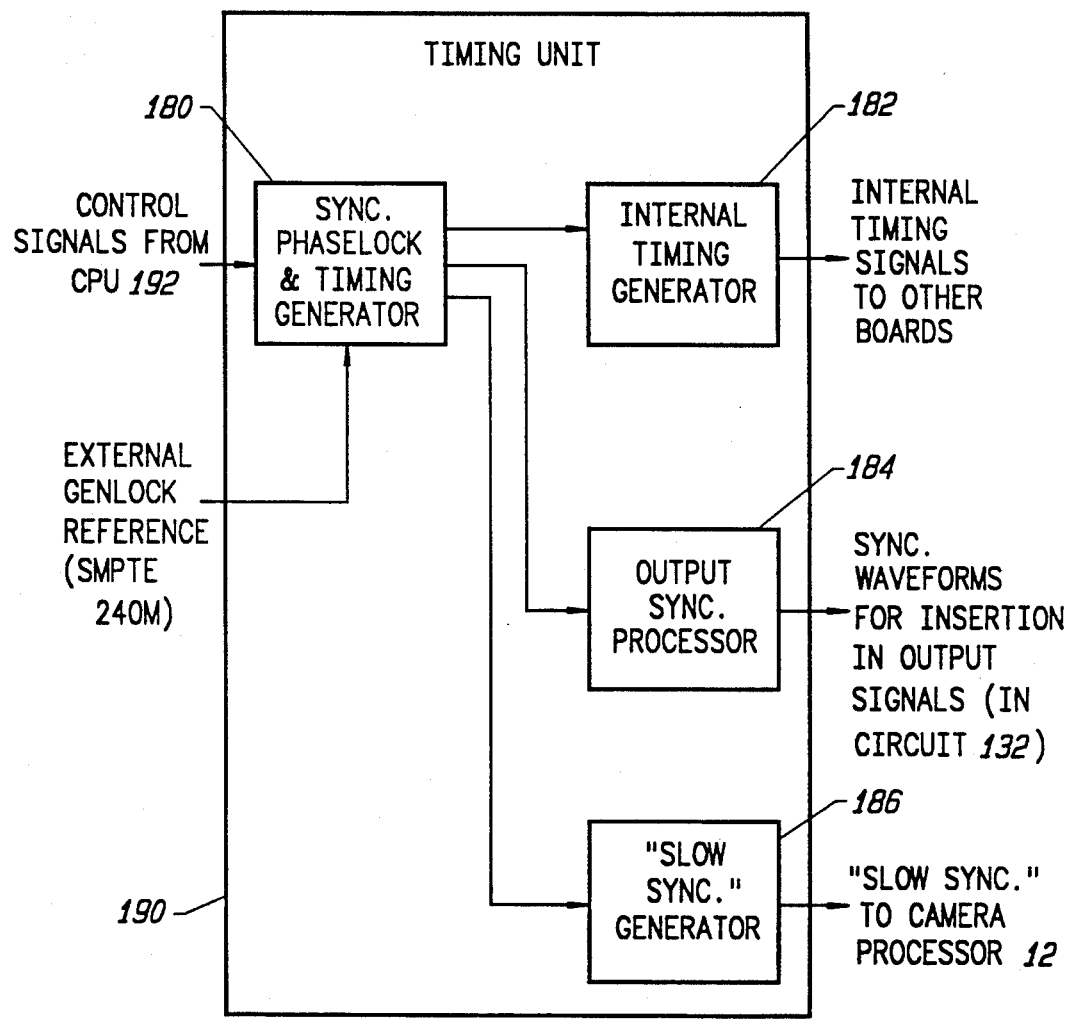
FIG. 10 is block diagram of the timing unit shown in FIG. 9.

With reference to FIG. 10, sync phaselock and timing generator 180 within timing unit 190 receives an external genlock reference signal (preferably an SMPTE-240M genlock reference signal), so that all signals supplied from circuit 180 to the other components of timing unit 190 are phaselocked to the external genlock reference. Slow sync generator 186 generates the above-mentioned low rate synchronization signal ("slow sync") for use by camera processor 12 in response to control signals from CPU 192. Output sync processor 184 generates synchronization waveforms for insertion in circuit 132 into the digital video data stream as described above, in response to control signals from CPU 192. Internal timing generator 182 generates other timing signals for use by processors 70, 72, and 74, in response to control signals from CPU 192.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A system for digitally processing a digital signal representing digitized color images, by generating from the digital signal a set of transformed component signals corresponding to different polynomial terms of a color transformation, including:
   a first low-pass filter for receiving the digital signal and generating a first filtered signal therefrom;
   a second low-pass filter, connected in parallel with the first low-pass filter, for receiving the digital signal and generating a second filtered signal therefrom;
   a first color correction circuit for receiving the first filtered signal and applying thereto a first order polynomial term of the color transformation to generate a first transformed component signal, wherein the first color correction circuit has a first clock frequency; and
   a second color correction circuit for receiving the second filtered signal and applying thereto a second order polynomial term of the color transformation to generate a second transformed component signal, wherein the second color correction circuit has a second clock frequency, wherein the first filtered signal has no significant frequency components with frequency greater than half the first clock frequency, and the second filtered signal has no significant frequency components with frequency greater than one fourth of the second clock frequency.

2. The system of claim 1, also including:
   a third low-pass filter, connected in parallel with the first low-pass filter, for receiving the digital signal and generating a third filtered signal therefrom; and
   a third color correction circuit for receiving the third filtered signal and applying thereto a third order polynomial term of the color transformation to generate a third transformed component signal, wherein the third color correction circuit has a third clock frequency, and the third filtered signal has no significant frequency components with frequency greater than one sixth of the third clock frequency.

3. The system of claim 2, also including:
   a means for combining the first transformed component signal, the second transformed component signal, and the third transformed component signal, to generate a transformed digital signal.

4. The system of claim 1, wherein each of the color correction circuits implements a different polynomial term of a gamma transformation.

5. A system for digitally performing a color transformation on a digital signal representing digitized color images, including:
   a set of parallel low-pass filters, each for receiving the digital signal and removing frequency components of the digital signal above a selected cutoff frequency, to reduce aliasing during subsequent color correction;
   a set of color correction circuits, each for receiving a filtered output signal from a different one of the set of the low-pass filters and applying thereto a polynomial term of a color transformation to generate a transformed component signal; and
   means for combining the transformed component signals to produce a transformed digital signal.

6. A system for digitally processing a digital signal comprising a red data stream, a blue data stream, and a green data stream, by generating from each of the red data stream, the blue data stream, and the green data stream a set of transformed component signals corresponding to different color transformation polynomial terms, including:
   a first set of low-pass filters for receiving the red data stream and generating therefrom a first set of filtered signals;
   a second set of low-pass filters for receiving the green data stream and generating therefrom a second set of filtered signals;
   a third set of low-pass filters for receiving the blue data stream and generating therefrom a third set of filtered signals;
   a first group of color correction circuits for receiving the first set of filtered signals and applying to each filtered signal in the first set a different polynomial term of a first color transformation, wherein the first set of low-pass filters ensures that application of each said polynomial term to each filtered signal in the first set does not result in an attempt to introduce frequency components having greater than half the clock frequency of each color correction circuit of the first group of color correction circuits receiving said filtered signal in the first set, which attempt would otherwise introduce aliasing;
   a second group of color correction circuits for receiving the second set of filtered signals and applying to each filtered signal in the second set a different polynomial term of a second color transformation, wherein the second set of low-pass filters ensures that application of each said polynomial term to each filtered signal in the second set does not result in an attempt to introduce frequency components having greater than half the clock frequency of each color correction circuit of the second group of color correction circuits receiving said filtered signal in the second set, which attempt would otherwise introduce aliasing; and
   a third group of color correction circuits for receiving the third set of filtered signals and applying to each filtered signal in the third set a different polynomial term of a third color transformation, wherein the third set of low-pass filters ensures that application of each said polynomial term to each filtered signal in the third set does not result in an attempt to introduce frequency components having greater than half the clock frequency of each color correction circuit of the third group of color correction circuits receiving said filtered signal in the third set, which attempt would otherwise introduce aliasing.

7. The system of claim 6, wherein:
the first set of low-pass filters includes a first low-pass filter and a second low-pass filter connected in parallel with the first low-pass filter;
the second set of low-pass filters includes a third low-pass filter and a fourth low-pass filter connected in parallel with the third low-pass filter; and
the third set of low-pass filters includes a fifth low-pass filter and a sixth low-pass filter connected in parallel with the fifth low-pass filter.

8. The system of claim 6, wherein each of the first color transformation, the second color transformation, and the third color transformation is a gamma transformation.

9. The system of claim 6, wherein the first color transformation, the second color transformation, and the third color transformation are identical.

10. A method for digitally performing a color transformation on a digital signal representing digitized color images, including the steps of:
generating a first low-pass filtered signal from the digital signal;
generating a second low-pass filtered signal from the digital signal;
applying a first order polynomial term of a color transformation to the first low-pass filtered signal to generate a first transformed component signal; and
applying a second order polynomial term of a color transformation to the second low-pass filtered signal to generate a second transformed component signal.

11. The method of claim 10, also including the step of:
combining the first transformed component signal and the second transformed component signal to generate a transformed digital signal.

12. The method of claim 10, also including the steps of:
generating a third low-pass filtered signal from the digital signal;
applying a third order polynomial term of a color transformation to the third low-pass filtered signal to generate a third transformed component signal; and
combining the first transformed component signal, the second transformed component signal, and the third transformed component signal to generate a transformed digital signal.

13. A method for digitally performing a color transformation on a digital signal representing digitized color images, including the steps of:
generating a set of low-pass filtered signals, wherein each of the low-pass filtered signals is generated by removing frequency components of the digital signal above a selected cutoff frequency to reduce aliasing during subsequent color transformation; and
applying a different polynomial term of a color transformation to each of the low-pass filtered signals, to generate a set of transformed component signals.

14. The method of claim 13, also including the step of:
combining the transformed component signals to produce a transformed digital signal.

* * * * *